July 17, 1923.
F. M. FUNK ET AL
REVERSING CHUCK
Filed March 9, 1921
1,461,871
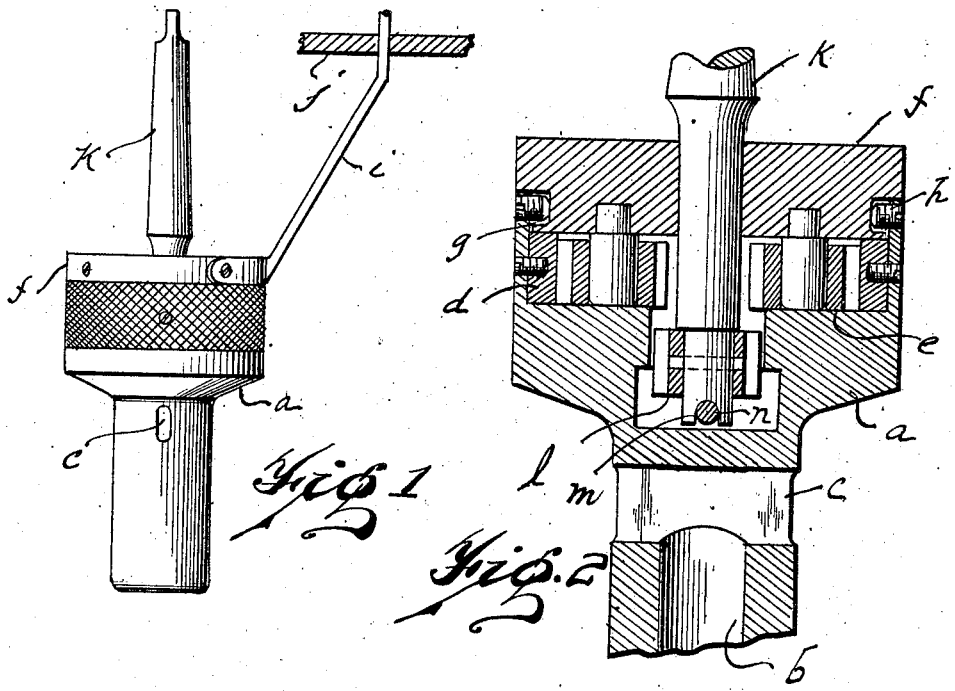
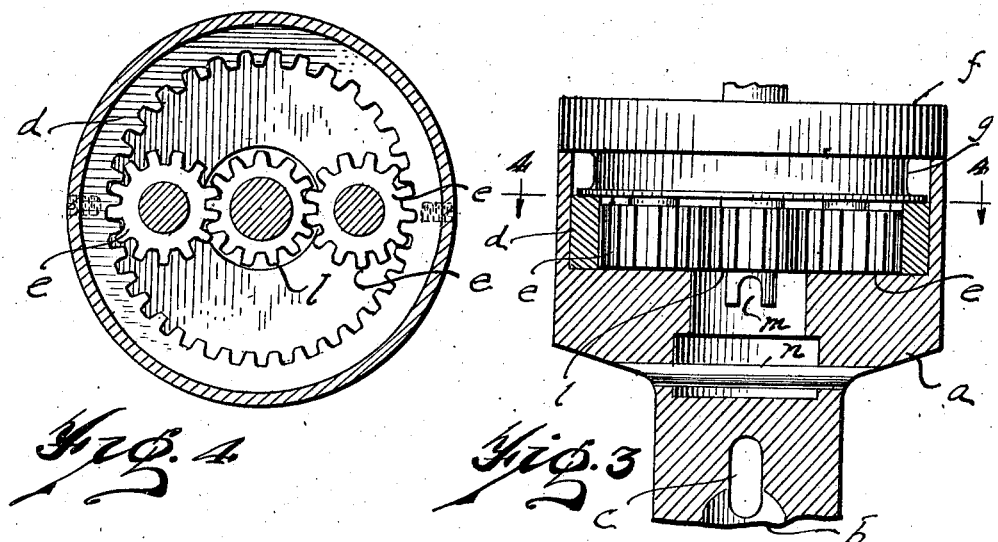
INVENTOR.
Frank M. Funk
Martin C. Jenners
BY
Stuart C. Barnes
ATTORNEY.

Patented July 17, 1923.

1,461,871

UNITED STATES PATENT OFFICE.

FRANK M. FUNK AND MARTIN C. JENNERS, OF DETROIT, MICHIGAN.

REVERSING CHUCK.

Application filed March 9, 1921. Serial No. 451,028.

*To all whom it may concern:*

Be it known that we, FRANK M. FUNK and MARTIN C. JENNERS, citizens of the United States, residing at Detroit, in the county of Wayne and State of Michigan, have invented certain new and useful Improvements in Reversing Chucks, of which the following is a specification.

This invention relates to reversible chucks, especially a reversible chuck for use in connection with a stud driver. A stud driver is a tool for screwing onto the end of a threaded stud for the purpose of screwing the stud into a base. For instance, the stud is threaded on both ends and is used for clamping the head and the cylinder block of an internal combustion engine together, and it becomes necessary to run the studs into the threaded sockets in the cylinder block. In order to get a grip on the stud to turn it into the sockets of the cylinder block it is necessary to have a tool that can be screwed onto the threads of the upper end of the stud. Such a tool is called a stud driver. Tools of this type are shown in Mr. Funk's prior Patents Nos. 1,298,324 and 1,308,490.

Obviously it is necessary to back the stud driver off from the stud after the stud has been turned into its socket. Usually some manner of release is provided to loosen the stud driver from the head of the stud so as not to back the stud out of its socket. This is explained in Mr. Funk's prior patents.

It is the object of the present invention to provide a chuck that can be used with such a stud driver so that these studs may be driven in and released by power. For instance, the stud driver may be driven by a drill press which is designed to rotate its spindle only in one direction.

In the drawings,—

Fig. 1 is a side elevation of the reversible chuck.

Fig. 2 is a vertical longitudinal section broken off at the ends.

Fig. 3 is a fragmentary vertical longitudinal section with the body $a$ of the tool taken ninety degrees removed from the showing in Fig. 2 and showing some of the parts in elevation.

Fig. 4 is a section on the line 4—4 of Fig. 3.

$a$ designates the body of the tool which is provided with tang socket $b$ adapted to receive the tang of the stud driver or any other tool. A slot $c$ is bored through the body of the chuck and through the top of the tang socket to provide a flattened extension of the tang socket to hold the usual flattened end of the tang. This is simply a substitute for making a non-circular recess in the end of the tang socket. The upper end of the body is of an enlarged diameter and is provided with a large bored-out chamber to receive the reversing pinions and gear. The gear is an internal toothed ring $d$. The teeth of this internal gear are in constant mesh with the planetary pinions $e$ rotatably supported upon the head $f$ which is provided with an annular groove $g$ in which engages the threaded studs $h$ screwed through the side of the body $a$. This assembles the head to the body so that the body may rotate with respect to the head. An arm $i$ is secured to the head and reaches up and engages with any part of the drill press, such as the part $j$, for the purpose of anchoring the head $f$. $k$ designates a shank adapted to engage with the driving member of the drill press or other machine. The end of this shank has a pinion $l$ pinned thereto and is provided with a slot $m$ adapted to engage with the pin $n$ secured in the body.

The operation is simple: The driving head of the drill press may be raised or lowered by a suitable lever to bring the tool into engagement with the work. This is well known construction. When the stud is to be driven into its socket the drill press head is lowered, forcing the shank $k$ down into engagement with the pin $n$ so as to connect the shank in driving relation with the body $a$. The body rotating rotates the stud driver and runs it onto the threads of the upper end of the stud. Continued rotation drives the stud into its threaded socket. The operation is then stopped and the drill press head raised. This pulls up the shank $k$ and engages the driving pinion $l$ with the planetary pinions $e$, at the same time the direct driving relation between the shank and the body of the chuck is broken by lifting the slotted end of the shank off from the pin $n$. Continued rotation of the shank in the same direction will obviously drive the chuck body in the reverse direction through the planetary pinions and the internal gear. The stud driver will be first released from the stud and then backed off the stud by this contrary rotative movement of the chuck body.

What we claim is:

1. In a chuck, the combination of a head and a body arranged to have relative rotative movement, a driving shank longitudinally movable with respect to said head and body which may be coupled up with one of the same in direct driving relation, a driving train supported between the head and body including one or more planetary members with which the shank may be engaged, when disengaged from direct driving relation, for the purpose of reversing the driving effect.

2. In a chuck, the combination of a stationary head, an intermediate gear of a planetary system supported by said head, a body rotatably supported on said stationary head having the internal ring gear of the planetary system mounted thereon, and a driving shank longitudinally movable with respect to said head, body and intermediate gear of the planetary system, adapted to be coupled with said rotatable body in direct driving relation and to drive said intermediate gear of the planetary system when disengaged from direct driving relation, for the purpose of reversing the driving effect.

3. In a chuck, the combination of a stationary head, an intermediate gear of a planetary system supported by said head, a body rotatably supported on said stationary head having the internal ring gear of the planetary system mounted thereon and provided with a transverse member secured therein, and a driving shank longitudinally movable with respect to said head, body and intermediate gear of the planetary system provided with a slot in the lower end thereof adapted to engage said member in said rotatable body in direct driving relation and to drive said intermediate gear of the planetary system when disengaged from direct driving relation for the purpose of reversing the driving effect.

4. In a chuck, the combination of a stationary head, an intermediate gear of a planetary system supported by said head, a body rotatably supported on said stationary head having the internal ring gear of the planetary system mounted thereon and provided with a transverse member secured therein, and a driving shank longitudinally movable with respect to said head, body and intermediate gear of the planetary system provided with a slot in the lower end thereof adapted to engage said member in said rotatable body in direct driving relation, and having a pinion forming the center gear of the planetary system mounted on said driving shank adapted to engage said intermediate gear of the planetary system when disengaged from direct driving relation for the purpose of reversing the driving effect.

5. In a chuck, the combination of a stationary head, an intermediate gear of a planetary system supported by said head, a body rotatably supported on said stationary head having the internal ring gear of the planetary system mounted thereon and provided with a transverse member secured therein and a driving shank longitudinally movable with respect to said head, body and intermediate gear of the planetary system provided with a tang in the upper end thereof adapted to engage in the movable driving head of a drill press or like machine, (means to lower and raise the driving shank into direct and reverse driving relation respectively), and provided with a slot in the lower end thereof adapted to engage said member in said rotatable body in direct driving relation, and having a pinion forming the center gear of the planetary system mounted on said driving shank adapted to engage said intermediate gear of the planetary system when disengaged from direct driving relation for the purpose of reversing the driving effect.

In testimony whereof we affix our signatures.

FRANK M. FUNK.
MARTIN C. JENNERS.